(12) United States Patent
Horng et al.

(10) Patent No.: US 9,399,999 B2
(45) Date of Patent: *Jul. 26, 2016

(54) HEAT DISSIPATING FAN

(71) Applicant: Sunonwealth Electric Machine Industry Co., Ltd., Kaohsiung (TW)

(72) Inventors: Alex Horng, Kaohsiung (TW); Chao-Hsun Lee, Kaohsiung (TW); Chi-Min Wang, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 734 days.

This patent is subject to a terminal disclaimer.

(21) Appl. No.: 13/783,451

(22) Filed: Mar. 4, 2013

(65) Prior Publication Data

US 2013/0177402 A1    Jul. 11, 2013

Related U.S. Application Data

(63) Continuation-in-part of application No. 12/604,445, filed on Oct. 23, 2009.

(51) Int. Cl.
*F04B 35/04* (2006.01)
*F04D 29/70* (2006.01)
(Continued)

(52) U.S. Cl.
CPC .......... *F04D 29/703* (2013.01); *F04D 13/0606* (2013.01); *F04D 17/16* (2013.01); *F04D 25/0633* (2013.01); *F04D 27/004* (2013.01); *F04D 29/4226* (2013.01); *F04D 29/701* (2013.01)

(58) Field of Classification Search
CPC . F04D 29/703; F04D 29/701; F04D 29/4226; F04D 25/0633; F04D 27/004; F04D 17/16; F04D 13/0606
See application file for complete search history.

(56) References Cited

U.S. PATENT DOCUMENTS

| 5,226,285 | A | | 7/1993 | Dankowski |
| 5,979,541 | A | | 11/1999 | Saito |
| 6,132,170 | A | * | 10/2000 | Horng ............... F04D 29/325 361/679.48 |

(Continued)

FOREIGN PATENT DOCUMENTS

| CN | 201071832 Y | 6/2008 |
| CN | 100478837 C | 4/2009 |

(Continued)

*Primary Examiner* — Charles Freay
(74) *Attorney, Agent, or Firm* — Alan D. Kamrath; Kamrath IP Lawfirm, P.A.

(57) ABSTRACT

A heat dissipating fan includes a housing having a base and a sidewall coupled to the base. The sidewall defines a compartment. The housing includes an air inlet, an air outlet and a dust channel. The air outlet includes opposite first and second end edges located at a same straight side of the housing. The housing defines a first plane. The impeller includes a hub and several blades. The impeller defines a second plane. The compartment of the housing includes an air outlet section and a pressure accumulating section. The air outlet section is located between the first and second planes. The air outlet is located in the air outlet section. The dust channel extends in an angle with respect to the second plane. An impeller is coupled to the stator that is coupled to the base. A control element includes a driving circuit and a rotating direction control circuit.

7 Claims, 8 Drawing Sheets

(51) Int. Cl.
*F04D 13/06* (2006.01)
*F04D 27/00* (2006.01)
*F04D 29/42* (2006.01)
*F04D 17/16* (2006.01)
*F04D 25/06* (2006.01)

(56) References Cited

U.S. PATENT DOCUMENTS

| | | | |
|---|---|---|---|
| 6,152,699 A | 11/2000 | Shikata et al. | |
| 7,345,874 B2 | 3/2008 | Cheng et al. | |
| 7,697,288 B2 | 4/2010 | Okutsu | |
| 7,806,344 B2 | 10/2010 | Chang | |
| 7,824,154 B2 | 11/2010 | Yabuuchi | |
| 8,702,401 B2 * | 4/2014 | Horng | F04D 29/4226 417/423.14 |
| 2007/0058346 A1 | 3/2007 | Yeh | |
| 2008/0253083 A1 * | 10/2008 | Okutsu | G06F 1/203 361/679.48 |

FOREIGN PATENT DOCUMENTS

| | | |
|---|---|---|
| JP | 36-19679 | 7/1961 |
| JP | 2001003889 A | 1/2001 |
| JP | 2005347671 A | 12/2005 |
| JP | 2008140943 A | 6/2008 |
| TW | I229254 | 3/2005 |

* cited by examiner ated on Oct. 23, 2009.

HEAT DISSIPATING FAN

CROSS REFERENCE TO RELATED APPLICATIONS

This is a continuation-in-part application of U.S. patent application Ser. No. 12/604,445 filed on Oct. 23, 2009.

BACKGROUND OF THE INVENTION

1. Field of the Invention

The present invention relates to a heat dissipating fan and, more particularly, to a heat dissipating fan with an automatic dust removing function.

2. Description of the Related Art

Conventional heat dissipating fans generally include a housing having an air inlet and an air outlet. An impeller is rotatably mounted in the housing and driven by a driving unit also mounted in the housing to draw in ambient air via the air inlet. The air currents drawn into the housing are concentrated before exiting the air outlet to a heat source in an electronic product. The temperature of the heat source during operation is, thus, lowered. However, dust carried by the air currents is liable to accumulate inside the housing at the air inlet, the air outlet, the blades of the impeller, etc., adversely affecting the air input and/or air output and, thus, adversely affecting the heat dissipating effect.

FIG. 1 shows a heat dissipating fan 9 including a housing 91 having an air inlet 911 and an air outlet 912. An impeller 92 is mounted in the housing 91. A plurality of fins 93 is mounted in the air outlet 912. Air currents can be driven by the impeller 92 into the housing 91 via the air inlet 911. The air currents pass through the fins 93 and the air outlet 912 to a heat source of an electronic product. An example of such a blower fan 9 is disclosed in Taiwan Patent No. I229254. However, dust is liable to accumulate inside the housing 91 after a period of time of use. Since the spacing between the fins 93 is small, the dust is liable to accumulate between the fins 93, significantly reducing the air output and requiring regular manual cleaning.

SUMMARY OF THE INVENTION

An objective of the present invention is to provide a heat dissipating fan that can remove dust automatically.

Another objective of the present invention is to provide a heat dissipating fan with reliable input and output of air by automatically removing dust.

The present invention fulfills the above objectives by providing, in a preferred aspect, a heat dissipating fan including a housing having a base and a sidewall coupled to the base. The sidewall defines a compartment. The housing further includes an air inlet, an air outlet and a dust channel. The air inlet, the air outlet and the dust channel are in communication with the compartment. The air outlet includes opposite first and second end edges in the sidewall parallel to and spaced from the axis. The first and second end edges of the air outlet are located at a same straight side of the housing. The housing defines a first plane including the first and second end edges. The impeller includes a hub extending along the axis and a plurality of blades coupled to an outer periphery of the hub. The impeller defines a second plane including the axis of the hub. The second plane is parallel to and spaced from the first plane. The compartment of the housing includes an air outlet section and a pressure accumulating section on opposite sides of the second plane. The air outlet section is located between the first and second planes. The air outlet is located in the air outlet section and extends through the sidewall. The dust channel is located in the pressure accumulating section and extends through the sidewall. A stator is coupled to the base of the housing. An impeller is rotatably coupled to the stator. A control element includes a driving circuit electrically connected to the stator and a rotating direction control circuit electrically connected to the driving circuit. The dust channel extends in a plane at an angle with respect to the second plane.

In the preferred form shown, the heat dissipating fan further comprises a dust guiding pipe attached to the dust channel.

In the preferred form shown, the heat dissipating fan further comprises a plurality of fins mounted in the air outlet of the housing at an angle other than perpendicular to the first plane.

In the preferred form shown, the heat dissipating fan further comprises a cover coupled to the sidewall of the housing, with the cover including an opening aligned with the air inlet.

In the preferred form shown, the base of the housing includes a plurality of auxiliary air inlets.

In the preferred form shown, the dust channel extends from the compartment in a third plane at an angle which is not parallel to the second plane. The air outlet extends from the compartment in a fourth plane at an angle which is not parallel to the second plane. The third and fourth planes define an angle less than 180 degrees between them.

In the preferred form shown, the third plane is perpendicular to the second plane.

In the preferred form shown, the air outlet includes a plurality of fins extending at an acute angle to the first plane.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

Figure 1:
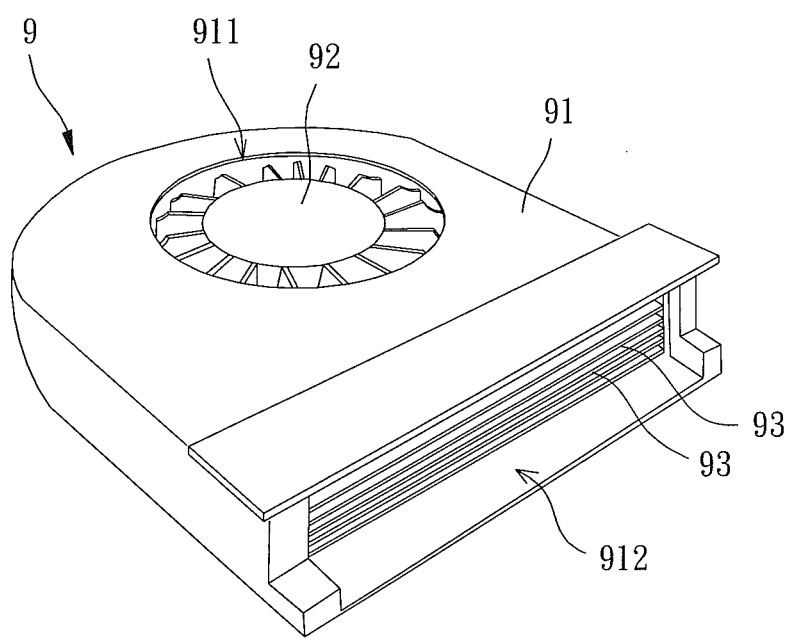
FIG. 1 shows a perspective view of a conventional heat dissipating fan.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "inner", "outer", "end", "section", "clockwise", "counterclockwise", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 2:
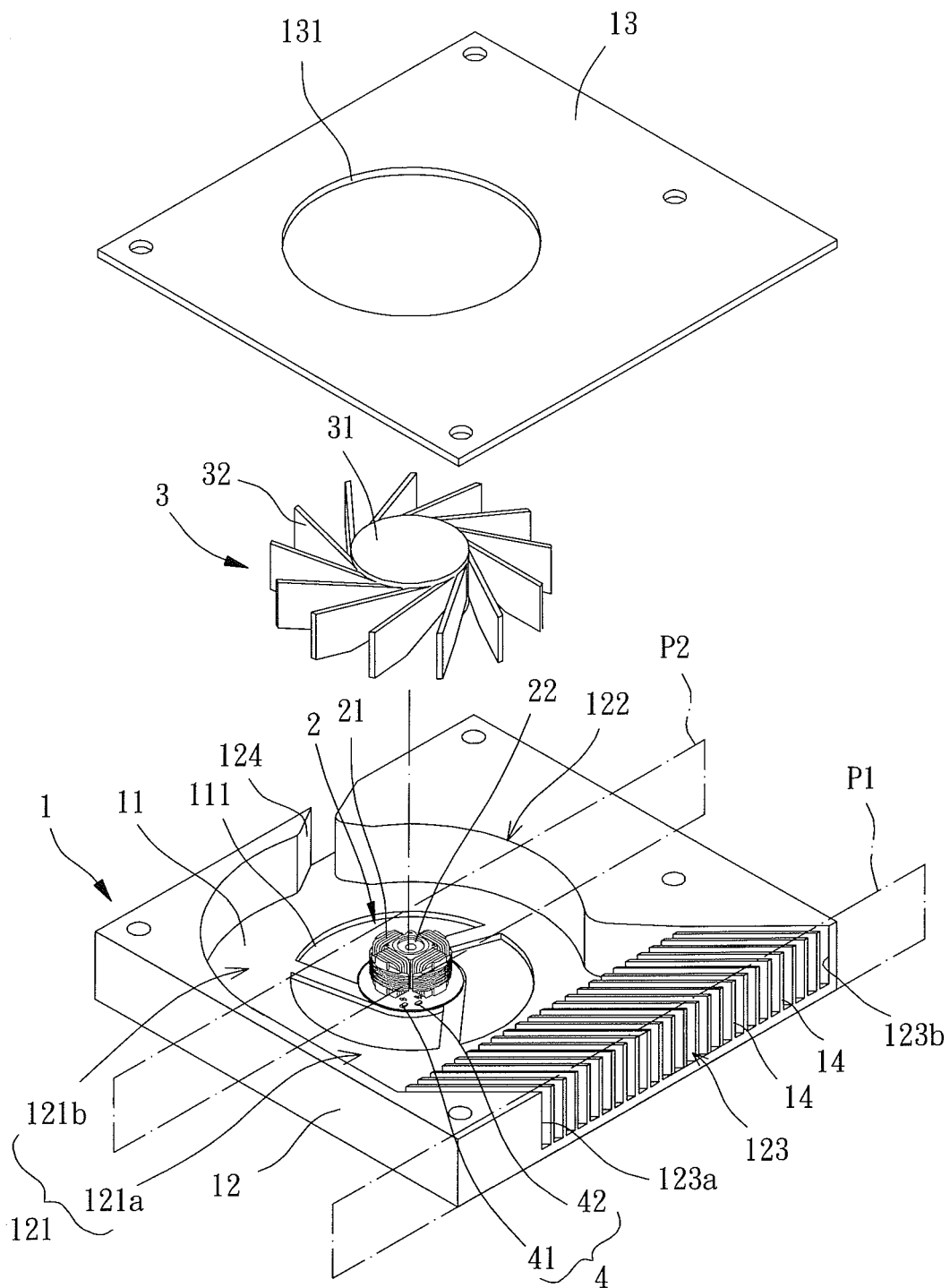
FIG. 2 shows an exploded, perspective view of a heat dissipating fan of a first embodiment according to the preferred teachings of the present invention.
Figure 3:
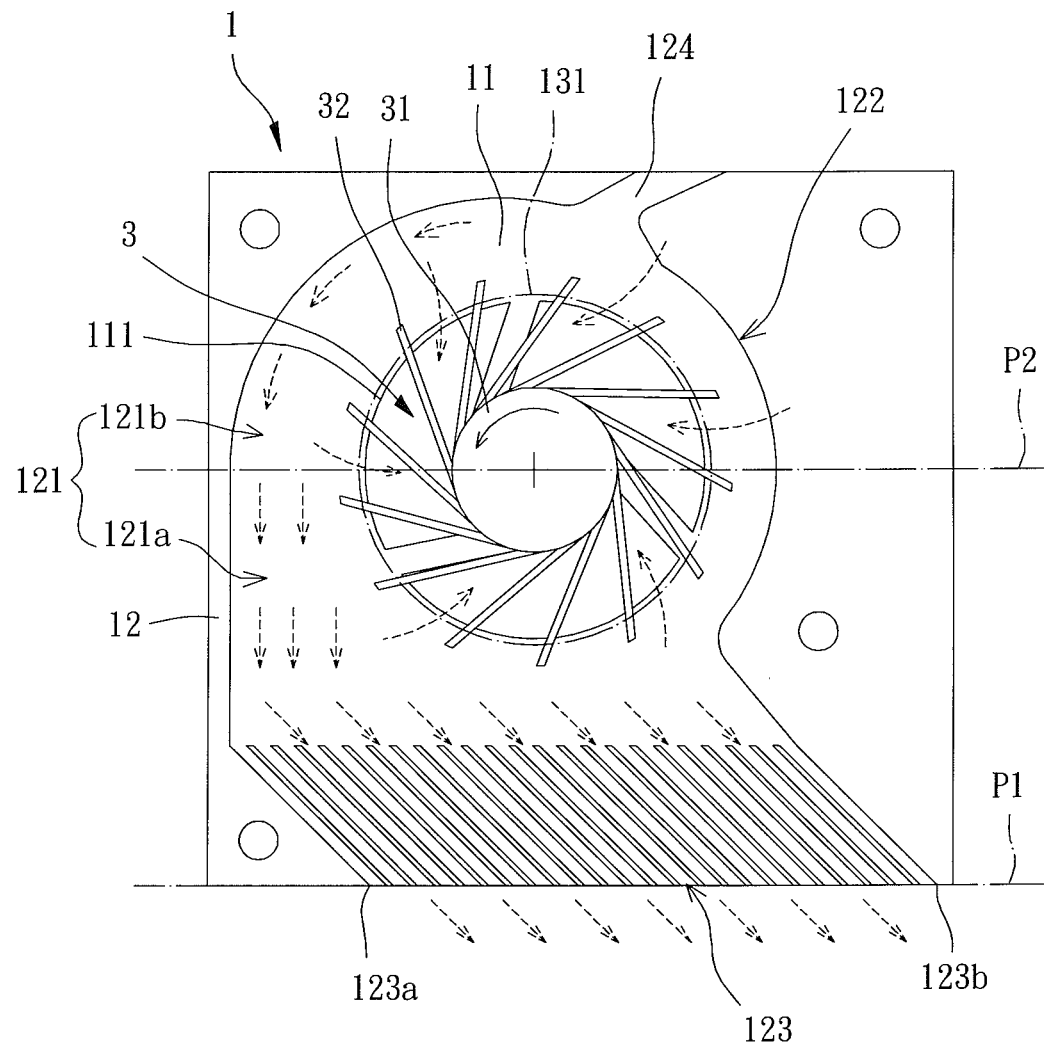
FIG. 3 shows a top view of the heat dissipating fan of FIG. 2 with a cover of the heat dissipating fan removed and with the heat dissipating fan rotating in a direction for heat dissipating purposes.

With reference to FIGS. 2 and 3, a heat dissipating fan of a first embodiment according to the preferred teachings of the present invention generally includes a housing 1, a stator 2, an impeller 3, and a control element 4. The housing 1 can be mounted in a desired location of an electronic product, such as a face of a main board inside a computer. The stator 2 is mounted in the housing 1. The impeller 3 is mounted in the housing 1 and rotatably coupled to the stator 2. The control element 4 controls the impeller 3 to rotate in a direction for generating enough air for heat dissipating purposes or to rotate in a reverse direction for dust removing purposes by cooperating with the structure of the housing 1.

Specifically, the housing 1 includes a base 11 and a sidewall 12 coupled to a side of the base 11 and defining a compartment 121. The sidewall 12 includes an air inlet 122 and an air outlet 123 both in communication with the compartment 121. The sidewall 12 further includes a dust channel 124 in communication with the compartment 121. It can be appreciated that the sidewall 12 can include more than one dust channel 124.

The stator 2 is mounted to the base 11 of the housing 1 and includes a coil unit 21 and a shaft seat 22. The coil unit 21 is mounted around or integrally formed with an outer periphery of the shaft seat 22. Alternatively, instead of being mounted to the base 11, the shaft seat 22 of the stator 2 may integrally formed on the base 11.

The impeller 3 includes a hub 31 and a plurality of blades 32. The hub 31 is rotatably coupled to the shaft seat 22 of the stator 2. The blades 32 are coupled to an outer periphery of the hub 31.

The control element 4 includes a driving circuit 41 and a rotating direction control circuit 42. The driving circuit 41 is electrically connected to the coil unit 21 of the stator 2. The rotating direction control circuit 42 is electrically connected to the driving circuit 41. The driving circuit 41 and the rotating direction control circuit 42 can be packaged in the same integrated circuit. Furthermore, the control element 4 can be integrated into the housing 1. However, the control element 4 can be external to the housing 1 without adversely affecting control on the impeller 3.

In use of the heat dissipating fan of the first embodiment according to the preferred teachings of the present invention, the heat dissipating fan is engaged with an electronic product with the air outlet 123 of the housing 1 facing a heat source of the electronic product that tends to generate heat during operation. The rotating direction control circuit 42 can send a rotating direction control signal to the driving circuit 41 to actuate the coil unit 21 of the stator 2 to create a magnetic field for driving the impeller 3 to rotate in a direction (such as the counterclockwise direction). Ambient air currents are drawn in via the air inlet 122. The air currents are concentrated by the impeller 3 before passing through the air outlet 123 to the heat source of the electronic product for heat dissipating purpose (FIG. 3).

Figure 4:
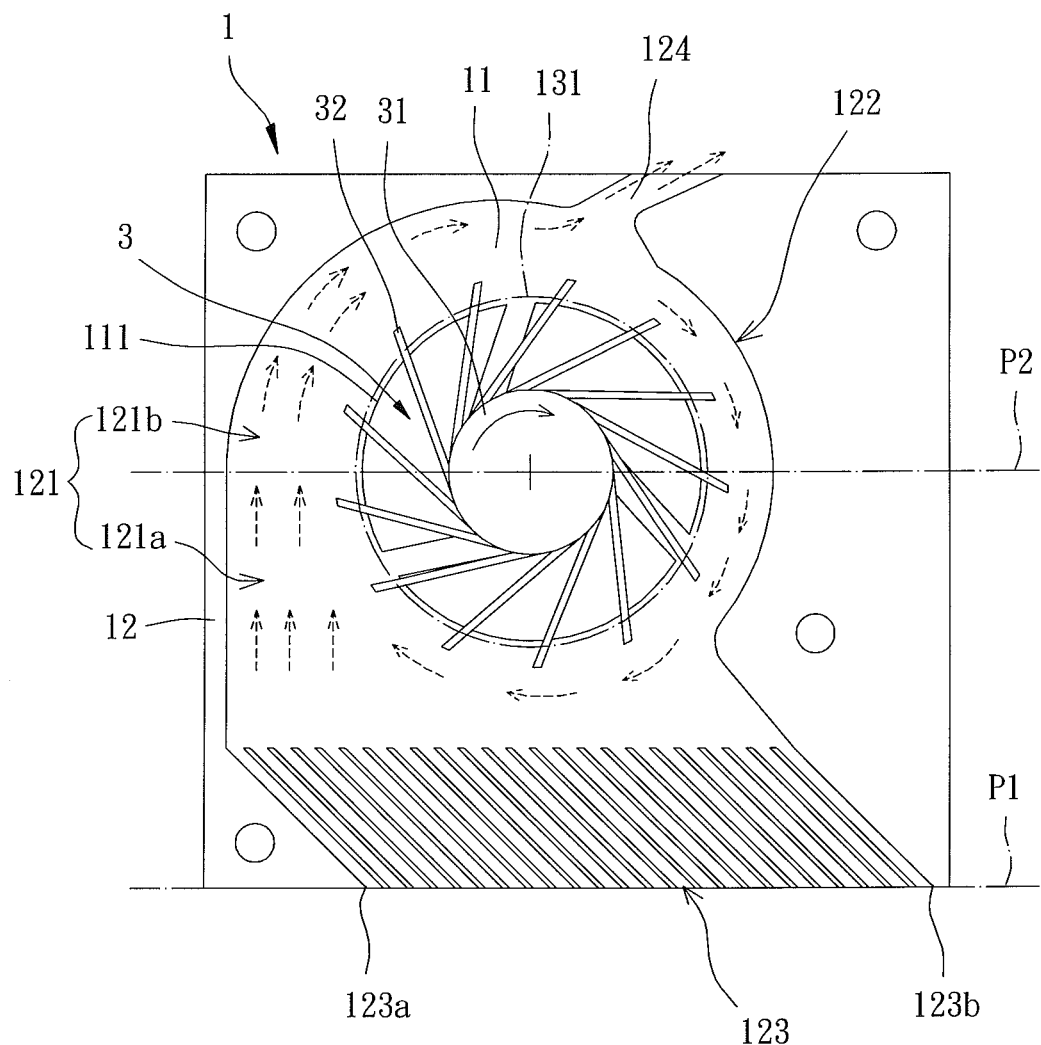
FIG. 4 shows a top view of the heat dissipating fan of FIG. 2 with a cover of the heat dissipating fan removed and with the heat dissipating fan rotating in a reverse direction for dust removing purposes.

Since dust is liable to accumulate inside the housing 1 (such as at the air inlet 122, the air outlet 123, the blades 32 of the impeller 3, etc.) after a period of time of use, the rotating direction control circuit 42 can send another rotating direction control signal to the driving circuit 41 to actuate the coil unit 21 of the stator 2 to create a magnetic field for driving the impeller 3 to rotate in a reverse direction (such as the clockwise direction). Ambient air currents are drawn in via the air inlet 122 and then exit the housing 1 via the dust channel 124 (FIG. 4). Thus, the dust accumulated inside the housing 1 can be expelled from the housing 1 to the environment together with the air currents, eliminating accumulation of the dust. Thus, the overall air input and output are not adversely affected, effectively enhancing the heat dissipating effect.

More specifically, the rotating direction control circuit 42 can control the timing of rotation of the impeller 3 in the counterclockwise or clockwise direction through the driving circuit 41. As an example, the heat dissipating fan according to the teachings of the present invention can be set that the impeller 3 rotates in the counterclockwise direction for a period of time (such as an hour or two) immediately after the heat dissipating fan is turned on. Then, the impeller 3 is controlled to rotate in the clockwise direction for another period of time (such as 10 or 20 minutes) for automatic removal of dust. After the automatic dust removing operation, the impeller 3 is controlled to rotate in the counterclockwise direction for heat dissipating purposes. Namely, the rotational direction of the impeller 3 can continuously alternate between the counterclockwise and clockwise directions to complete functions of heat dissipating and dust removing alternatively. In another example, the heat dissipating fan according to the teachings of the present invention can be set that the impeller 3 rotates in the clockwise direction for a period of time for automatic dust removing operation immediately after the heat dissipating fan is turned on. Then, the impeller 3 is controlled to rotate in the counterclockwise direction for heat dissipating purposes.

By controlling the impeller 3 to rotate in a reverse direction with the rotating direction control circuit 42 via the driving circuit 41, the heat dissipating fan of the first embodiment according to the preferred teachings of the present invention can automatically remove dust without adversely affecting the heat dissipating function. Thus, accumulation of dust inside the housing 1 is eliminated to avoid adverse affect to the overall heat dissipating effect. The heat dissipating effect is, thus, enhanced, and the service life of the electronic product is prolonged.

The heat dissipating fan according to the teachings of the present invention can incorporate additional features to perfect the functions. Particularly, with reference to FIGS. 2 and 3, the air outlet 123 of the housing 1 includes opposite first and second end edges 123a and 123b. The first and second end edges 123a and 123b are located at a same straight side of the housing 1. The housing 1 defines a first plane P1 including the first and second end edges 123a and 123b. The impeller 3 defines a second plane P2 including a center of the hub 31. The second plane P2 is parallel to and spaced from the first plane P1. The compartment 121 is divided into an air outlet section 121a and a pressure accumulating section 121b by defining the first and second planes P1 and P2. The air outlet section 121a is located between the first and second planes P1 and P2. The pressure accumulating section 121*b* and the air outlet section 121*a* are located on opposite sides of the second plane P2. The air outlet 123 is located in the air outlet section 121*a*. The dust channel 124 is located in the pressure accumulating section 121*b*. Thus, the dust channel 124 is away from the air outlet 123. When the control element 4 controls the impeller 3 to rotate in the clockwise direction, the impeller 3 can drive the air currents from the air outlet section 121*a* to the pressure accumulating section 121*b* more thoroughly, so that the dust accumulated inside the housing 1 can be smoothly removed together with the air currents exiting the dust channel 124 to the environment. The overall dust removing effect is, thus, enhanced.

With reference to FIG. 4, the dust channel 124 extends in a direction at an angle with the second plane P2. However, the dust channel 124 can extend in a direction perpendicular or parallel to the second plane P2. The extending direction of the dust channel 124 is preferably related to the moving direction of the air currents driven by the impeller 3 rotating in the clockwise direction. In the example shown in FIG. 4, the dust channel 124 extends in a direction at an angle with the second plane P2 to reduce the resistance to the air currents that are driven by the impeller 3 to flow along an inner face of the sidewall 12 into the dust channel 124, assuring smooth dust removal operation.

With reference to FIGS. 2 and 3, a cover 13 can be mounted to the sidewall 12 of the housing 1. The cover 13 includes an opening 131 aligned with the air inlet 122. The cover 13 covers the compartment 121 over the air inlet 122, so that the air currents generated by the impeller 3 can enter the housing 1 via the opening 131 and the air inlet 122, providing a pressure increasing effect to smoothly guide the air currents to exit the air outlet 123.

With reference to FIGS. 2 and 3, the base 11 of the housing 1 can further include a plurality of auxiliary air inlets 111 aligned with the air inlet 122. The air currents generated by the impeller 3 can also enter the housing 1 via the auxiliary air inlets 111, increasing the air input.

With reference to FIGS. 2 and 3, a plurality of fins 14 can be formed in the air outlet 123. The fins 14 can be directly formed in the air outlet 123 or integrated as a heat sink mounted to the air outlet 123. Thus, when the housing 1 is coupled to the electronic product, the fins 14 can absorb the high heat generated by the heat source of the electronic product, providing further enhanced heat dissipating effect while the impeller 3 drives air currents through the air outlet 123.

Figure 5:
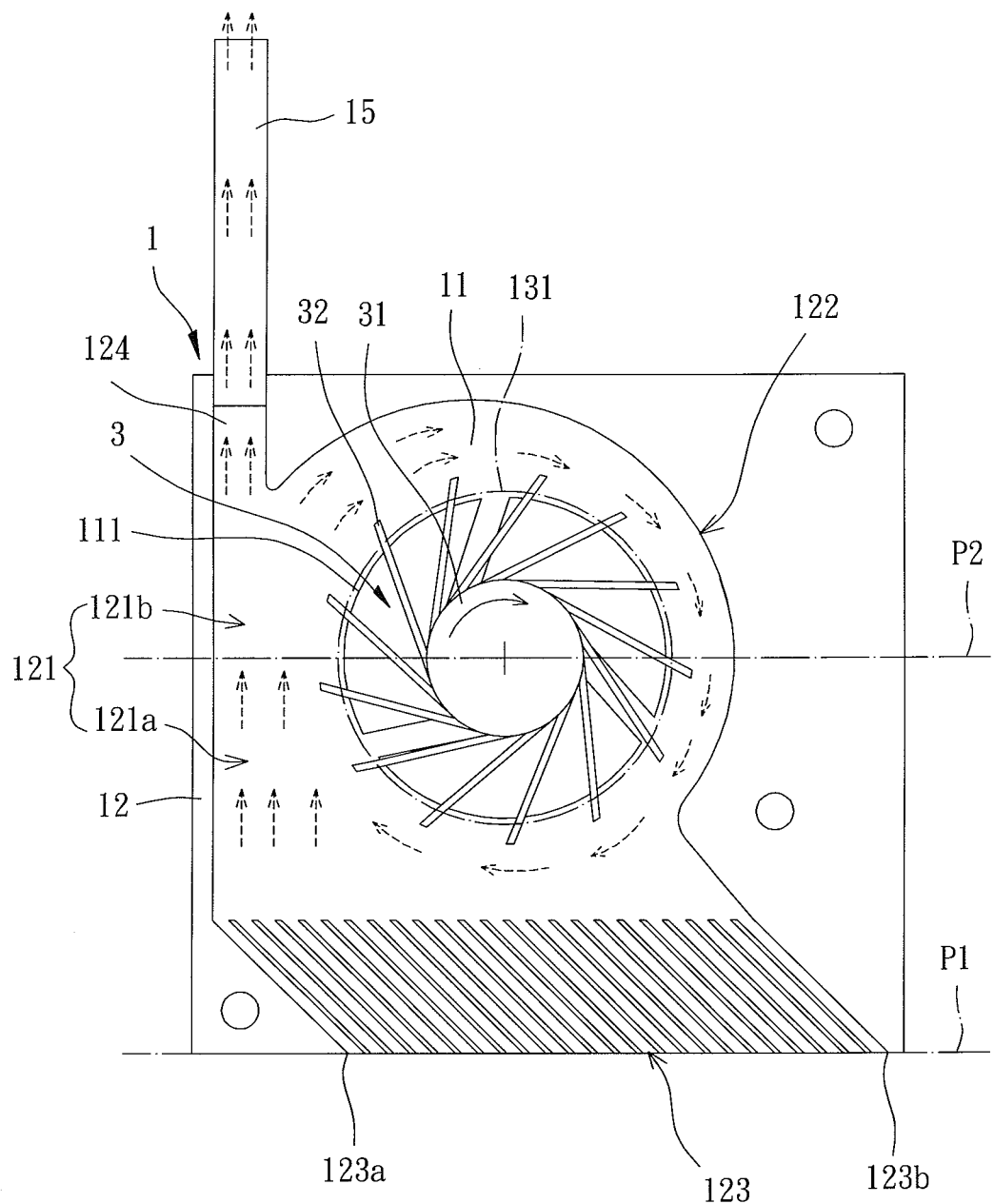
FIG. 5 shows a top view of another case of the heat dissipating fan of the first embodiment with a cover of the heat dissipating fan removed, with a dust guiding pipe attached to the heat dissipating fan, and with the heat dissipating fan rotating in a direction for dust removing purposes.

With reference to FIG. 5, a dust guiding pipe 15 can be attached to the dust channel 124 for guiding the dust removed from the housing 1 to a position away from the housing 1, assuring the dust removing effect.

Figure 6:
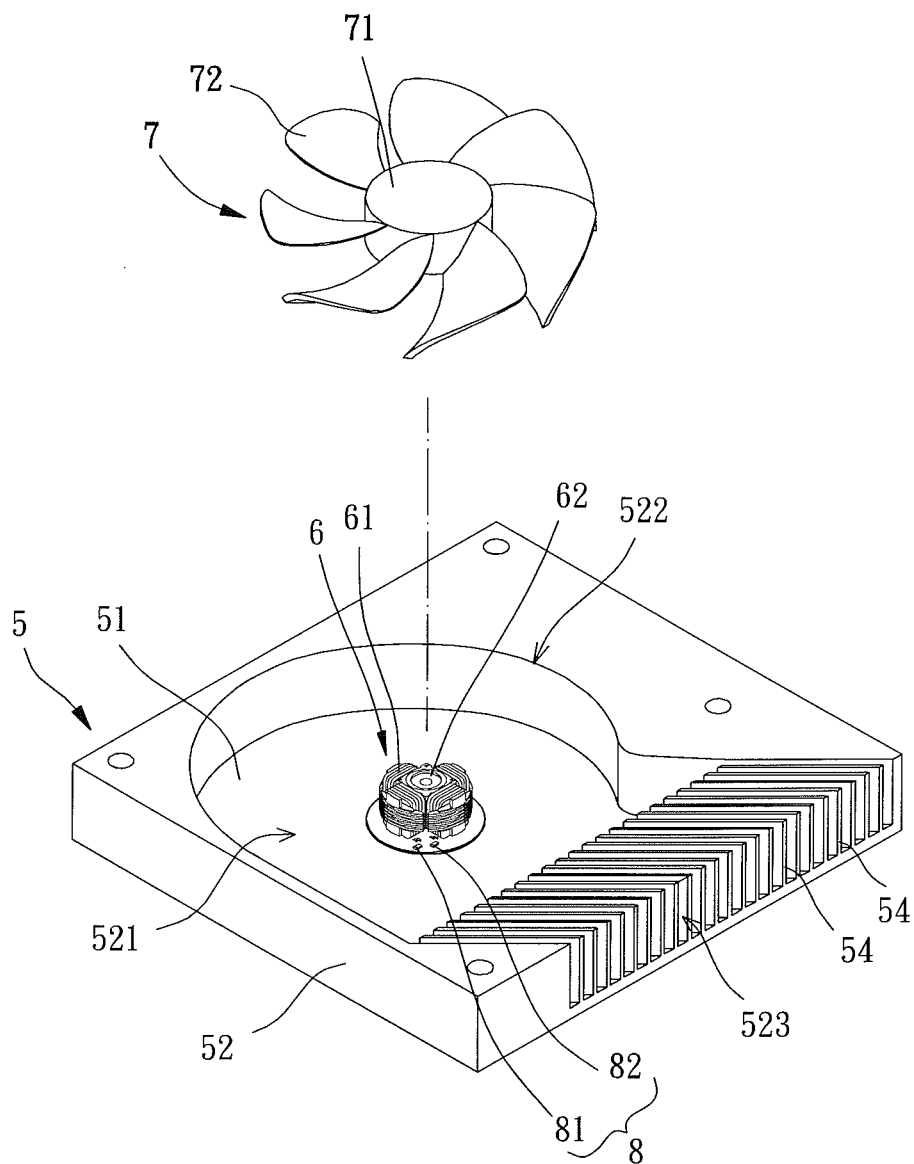
FIG. 6 shows an exploded, perspective view of a heat dissipating fan of a second embodiment according to the preferred teachings of the present invention.
Figure 7:
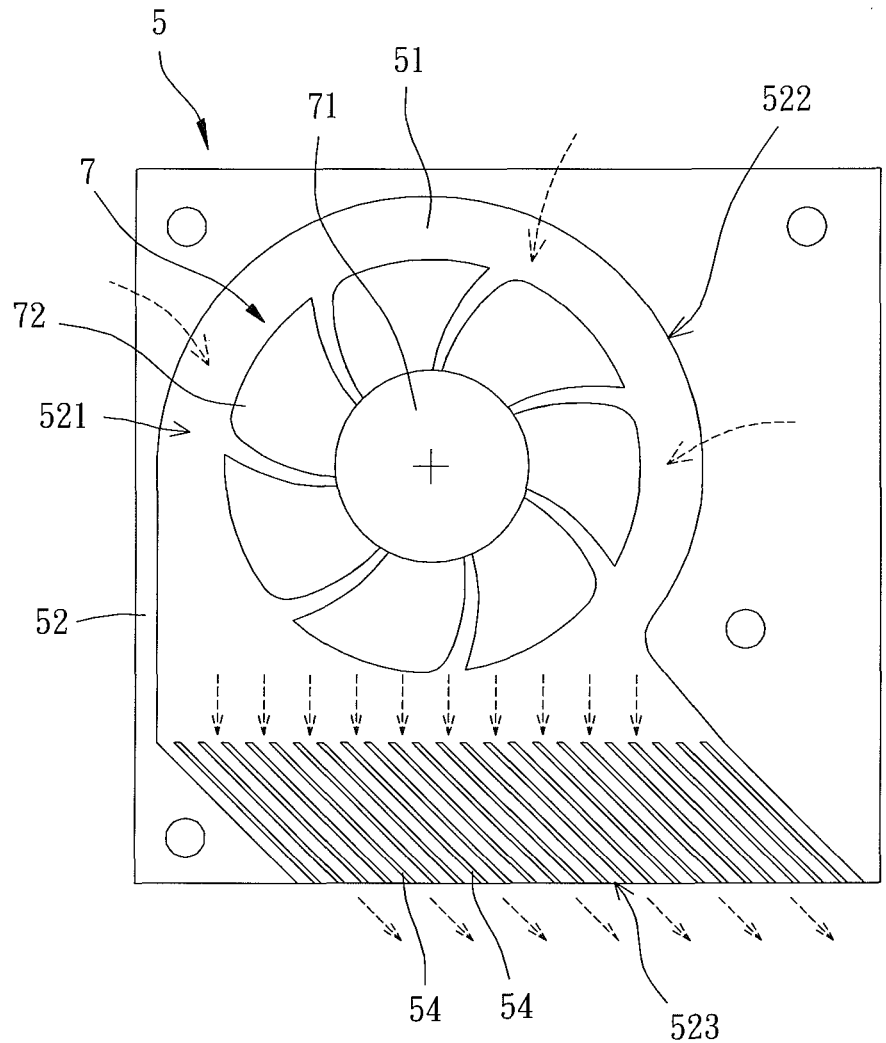
FIG. 7 shows a top view of the heat dissipating fan of FIG. 6 with the heat dissipating fan rotating in a direction for heat dissipating purposes.
Figure 8:
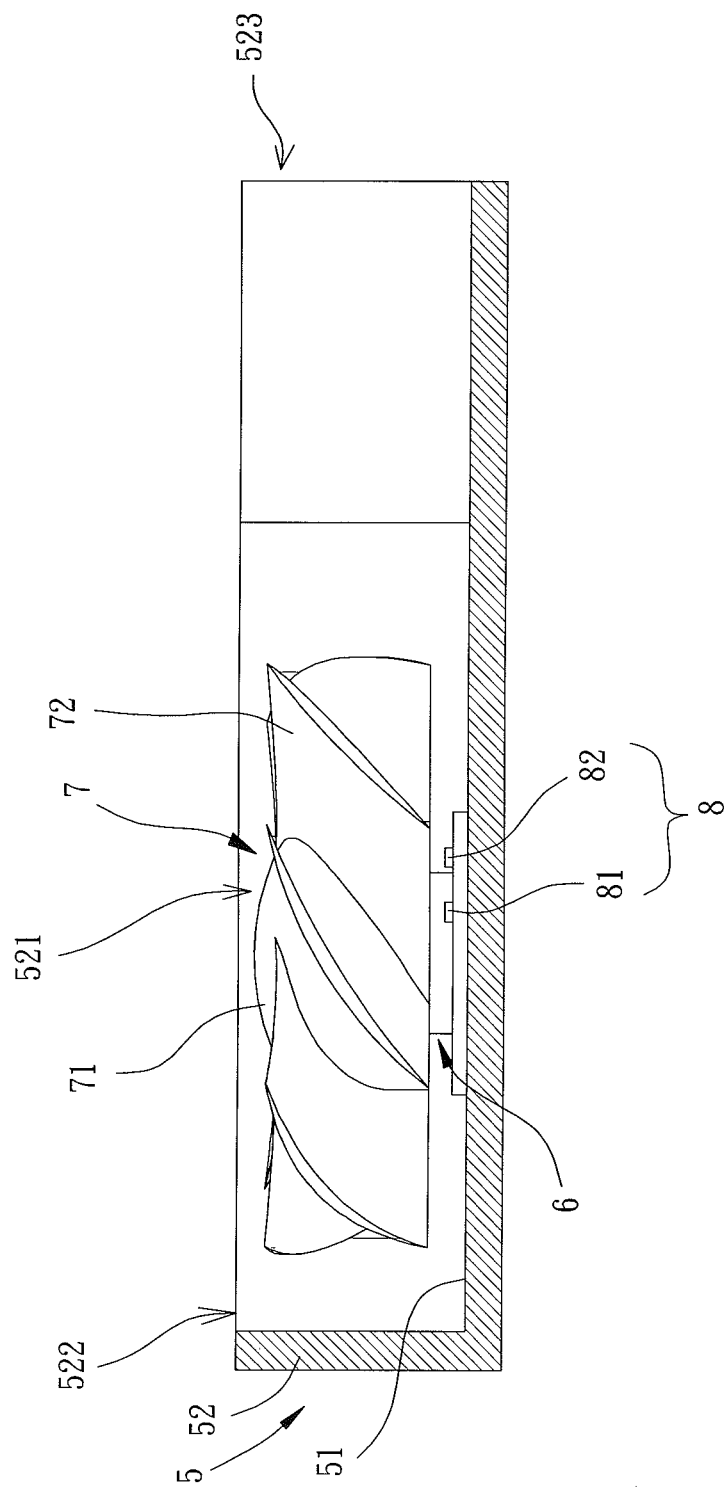
FIG. 8 shows a cross sectional view of the heat dissipating fan of FIG. 6.

FIGS. 6-8 show a heat dissipating fan of a second embodiment according to the preferred teachings of the present invention. In this embodiment, the heat dissipating fan includes a housing 5, a stator 6, an impeller 7, and a control element 8. Although the housing 5 is preferably of blower type, the housing 5 can be of axial-flow type. The stator 6 is mounted in the housing 5. The impeller 7 is rotatably coupled to the stator 6. The control element 8 controls the impeller 7 to rotate in the clockwise or counterclockwise direction.

Specifically, the housing 5 includes a base 51 and a lateral wall 52. The base 51 and the lateral wall 52 together define a compartment 521. The lateral wall 52 includes an air inlet 522 and an air outlet 523 both in communication with the compartment 521. The air inlet 522 can act as a dust channel. A plurality of fins 54 is mounted in the air outlet 523.

The stator 6 is mounted to the base 51 of the housing 5 and includes a coil unit 61 and a shaft seat 62. The coil unit 61 is mounted around or integrally formed with an outer periphery of the shaft seat 62. Alternatively, instead of being mounted to the base 51, the shaft seat 62 of the stator 6 may be integrally formed on the base 51.

The impeller 7 is mounted in the compartment 521 of the housing 5 and is preferably of an axial-flow type. The impeller 7 includes a hub 71 rotatably coupled to the shaft seat 62 of the stator 6 and a plurality of blades 72 coupled to an outer periphery of the hub 71.

The control element 8 includes a driving circuit 81 and a rotating direction control circuit 82. The driving circuit 81 is electrically connected to the coil unit 61 of the stator 6. The rotating direction control circuit 82 is electrically connected to the driving circuit 81. The driving circuit 81 and the rotating direction control circuit 82 can be packaged in the same integrated circuit.

In use of the heat dissipating fan of the second embodiment according to the preferred teachings of the present invention, the rotating direction control circuit 82 can send a rotating direction control signal to the driving circuit 81 to drive the impeller 7 to rotate in a direction (such as the counterclockwise direction). Ambient air currents are drawn in via the air inlet 522 and then exit the air outlet 523 to the heat source of the electronic product for heat dissipating purposes (FIGS. 6 and 7). Furthermore, the rotating direction control circuit 82 can send another rotating direction control signal to the driving circuit 81 to drive the impeller 7 to rotate in a reverse direction (such as the clockwise direction). Due to the characteristics of the blades 72 of the axial-flow type impeller 7, the flowing direction of the air currents in the housing 5 driven by the impeller 7 rotating in the clockwise direction is opposite to that of the air currents driven by the impeller 7 rotating in the counterclockwise direction. Thus, the dust is less likely to accumulate in the housing 5. Rather, the dust is removed outside of the housing 5 via the air inlet 522 acting as a dust channel. Thus, the dust accumulated in the housing 5 can be expelled to the environment (FIGS. 6 and 8).

By controlling the impeller 7 to rotate in a reverse direction with the rotating direction control circuit 82 via the driving circuit 81, the heat dissipating fan of the second embodiment according to the preferred teachings of the present invention can automatically remove dust to avoid adverse affect to the overall heat dissipating effect resulting from accumulation of the dust in the housing 5 while providing the original heat dissipating function. Furthermore, the air inlet 522 of the housing 5 can be utilized as the dust channel without the need of forming a dust channel 124 in the sidewall 12 of the housing 1. The structure of the heat dissipating fan is, thus, simplified.

The additional features of the first embodiment can be utilized in the second embodiment according to the teachings of the present invention, details of which are not described to avoid redundancy.

In conclusion, the heat dissipating fans according to the teachings of the present invention can control the impeller 3, 7 by the rotating direction control circuit 42, 82 of the control element 4, 8 via the driving circuit 41, 81 to rotate in a reverse direction cooperating with the dust channel 124 (or the air inlet 522 of the second embodiment), allowing automatic dust removal operation to effectively remove the dust accumulated in the housing 1, 5 and, thus, providing convenient dust removing operation. Since the dust can be removed automatically, the dust is less likely to accumulate in the housing 1, 5 to an unexpected amount, effectively maintaining the air input and air output and enhancing the heat dissipating effect.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A heat dissipating fan comprising:
   a housing including a base and a sidewall coupled to the base, with the sidewall defining a compartment of a generally cylindrical shape having an axis, with the housing further including an air inlet formed by open ends of the compartment, an air outlet extending in a radial direction from the compartment through the sidewall, and a dust channel extending in a radial direction from the compartment through the sidewall, with the air inlet, the air outlet and the dust channel being in communication with the compartment, with the air outlet including opposite first and second end edges in the sidewall parallel to and spaced from the axis, with the first and second end edges of the air outlet located at a same straight side of the housing, with the housing defining a first plane including the first and second end edges;
   an impeller including a hub extending along the axis and a plurality of blades coupled to an outer periphery of the hub, with the impeller defining a second plane including the axis of the hub, with the second plane parallel to and spaced from the first plane, with the compartment of the housing including an air outlet section and a pressure accumulating section on opposite sides of the second plane, with the air outlet section located between the first and second planes, with the air outlet located in the air outlet section and extending through the sidewall, with the dust channel located in the pressure accumulating section, with the impeller rotatable in a direction for heat dissipation purposes and rotatable in an opposite direction for dust removing purposes, and with the dust channel extending from the compartment in a tangential vector of the opposite direction;
   a stator coupled to the base of the housing, with the impeller rotatably coupled to the stator about the axis and located within the compartment; and
   a control element including a driving circuit electrically connected to the stator and a rotating direction control circuit electrically connected to the driving circuit.

2. The heat dissipating fan as claimed in claim 1, further comprising a plurality of fins mounted in the air outlet of the housing at an angle other than perpendicular to the first plane.

3. The heat dissipating fan as claimed in claim 1, further comprising a cover coupled to the sidewall of the housing, with the cover including an opening aligned with the air inlet.

4. The heat dissipating fan as claimed in claim 1, with the base of the housing including a plurality of auxiliary air inlets.

5. The heat dissipating fan as claimed in claim 1, wherein the dust channel extends from the compartment in a third plane, with the air outlet extending from the compartment in a fourth plane at an angle which is not parallel to the second plane, with the third and fourth planes defining an angle less than 180 degrees between them.

6. The heat dissipating fan as claimed in claim 1, wherein the air outlet includes a plurality of fins extending at an acute angle to the first plane.

7. A heat dissipating fan comprising:
   a housing including a base and a sidewall coupled to the base, with the sidewall defining a compartment of a generally cylindrical shape having an axis, with the housing further including an air inlet formed by open ends of the compartment, an air outlet extending in a radial direction from the compartment through the sidewall, and a dust channel extending in a radial direction from the compartment through the sidewall, with the air inlet, the air outlet and the dust channel being in communication with the compartment, with the air outlet including opposite first and second end edges in the sidewall parallel to and spaced from the axis, with the first and second end edges of the air outlet located at a same straight side of the housing, with the housing defining a first plane including the first and second end edges;
   an impeller including a hub extending along the axis and a plurality of blades coupled to an outer periphery of the hub, with the impeller defining a second plane including the axis of the hub, with the second plane parallel to and spaced from the first plane, with the compartment of the housing including an air outlet section and a pressure accumulating section on opposite sides of the second plane, with the air outlet section located between the first and second planes, with the air outlet located in the air outlet section and extending through the sidewall, with the dust channel located in the pressure accumulating section, and with the dust channel extending in a plane at an angle with respect to the second plane;
   a dust guiding pipe attached to the dust channel;
   a stator coupled to the base of the housing, with the impeller rotatably coupled to the stator about the axis and located within the compartment; and
   a control element including a driving circuit electrically connected to the stator and a rotating direction control circuit electrically connected to the driving circuit.

* * * * *